United States Patent [19]
Tomerlin

[11] Patent Number: 5,973,903
[45] Date of Patent: Oct. 26, 1999

[54] FUEL LINE SYSTEMS WITH ELECTRIC CHARGE BUILDUP PREVENTION

[75] Inventor: Reggie Joe Tomerlin, Long Beach, Calif.

[73] Assignee: TransDigm, Inc., Richmond Heights, Ohio

[21] Appl. No.: 08/990,068

[22] Filed: Dec. 12, 1997

[51] Int. Cl.[6] ....................................... H05F 3/00
[52] U.S. Cl. ........................ 361/215; 361/212; 361/220
[58] Field of Search .................................. 361/212, 215, 361/220

[56] References Cited

U.S. PATENT DOCUMENTS

| | | | |
|---|---|---|---|
| 3,943,273 | 3/1976 | De Putter | 361/215 |
| 4,120,325 | 10/1978 | De Putter | 361/215 |
| 4,346,428 | 8/1982 | Gale | 361/215 |
| 4,487,462 | 12/1984 | Gale et al. | 361/215 |
| 4,928,202 | 5/1990 | Gale et al. | 361/215 |
| 4,985,801 | 1/1991 | Hellard et al. | 361/215 |

OTHER PUBLICATIONS

Swaging Manual, IMO Industries, Inc., Sep. 1984.
Leaflet entitled Fuel Line With Clamped Electrical Contact Straps, Jan. 1969.

*Primary Examiner*—Fritz Fleming
*Attorney, Agent, or Firm*—Benoit Law Corporation

[57] ABSTRACT

Fuel lines aboard aircraft are safeguarded against buildup of electric charges. A series of metallic tubes each having opposite open metallic tube ends are prepared for such fuel lines. External metallic ferrules are prepared for the opposite metallic tube ends of these metallic tubes. Each of these metallic ferrules is equipped with an electric discharge terminal for electric charges. Each metallic ferrule is bonded externally to a metallic tube end so that each metallic ferrule and a margin of that metallic tube end extend in one piece circumferentially around an inside of that metallic tube end and axially in one piece for an axial width of that metallic ferrule. External electric conductors extend between electric discharge terminals of adjacent metallic ferrules along the fuel line.

22 Claims, 1 Drawing Sheet

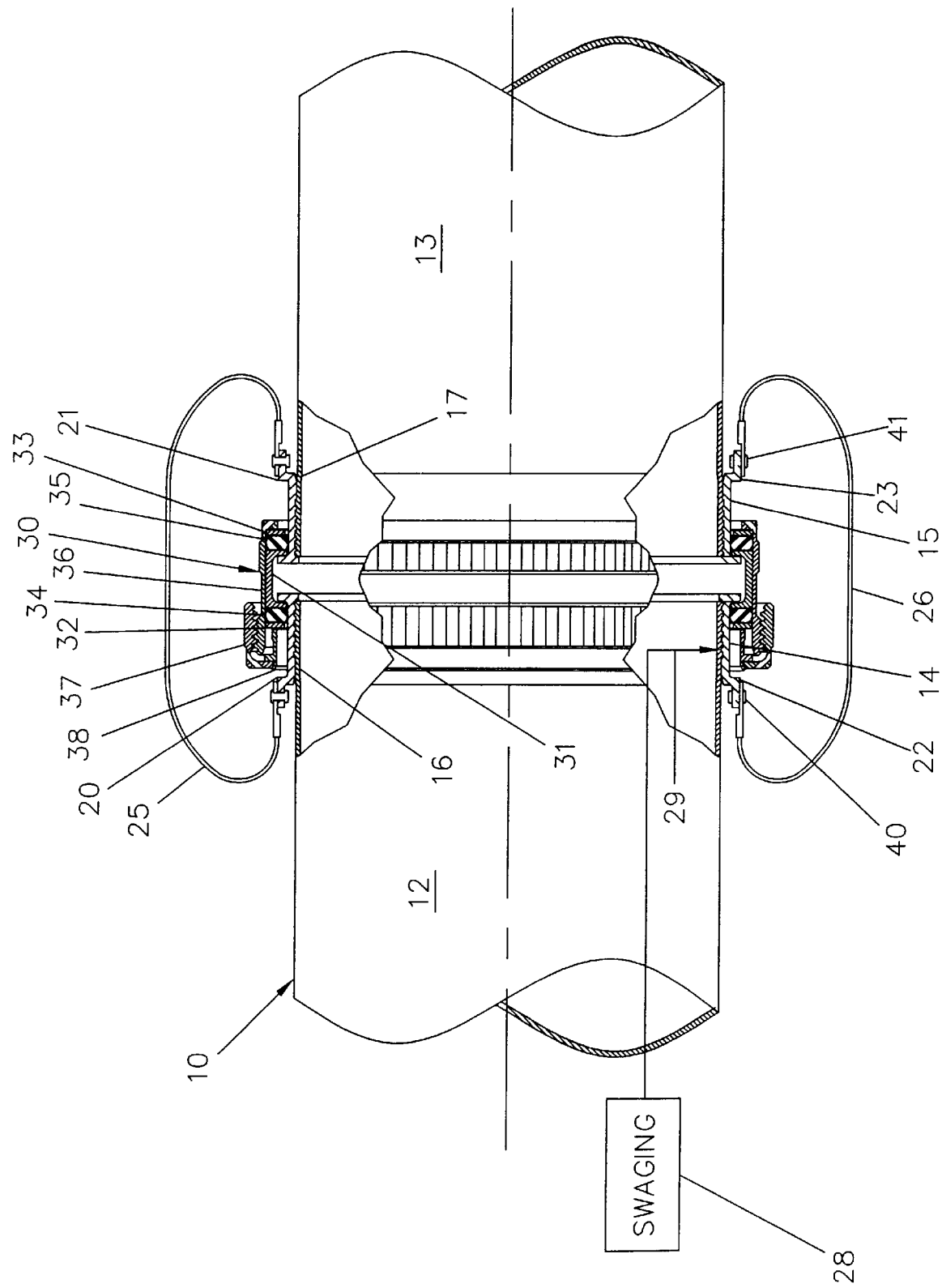

FUEL LINE SYSTEMS WITH ELECTRIC CHARGE BUILDUP PREVENTION

FIELD OF THE INVENTION

The subject invention relates to fuel line systems with electric charge buildup prevention and, more specifically, to methods of precluding buildup of electric charges at fuel lines aboard aircraft, and to aircraft including a fuel line safeguarded against buildup of electric charges.

BACKGROUND

On Jul. 17, 1996, TWA Flight 800 exploded over the Atlantic Ocean shortly after taking off from John F. Kennedy Airport. That disaster, including its loss of the 230 persons aboard, sparked the most extensive governmental investigation in the history of aviation. As a result, it became known that the disaster started as a fuel/air explosion in the almost empty center wing tank. However, what ignited those explosive fuel/air vapors in that tank is still a mystery that may never be solved.

After theories of sabotage and accidental missile impact have been discounted, one plausible culprit remains in the form of electric sparks in the fuel system. To this effect, the possibility of a short circuit in the wiring of fuel level sensors, an electrical defect in the fuel pump that has never been found at the crash site, or a discharge of static electricity have been mentioned. Intensive investigation and tests with a duplicate aircraft have found that the temperature inside and at the central fuel tank was high because of the location of the heat producing parts of air conditioning equipment below that fuel tank.

Sources of such electrical discharges include static electricity and lightning. Both are of triboelectric origin, in that static electric charges in fuel systems are built up from such activities as refueling, while lightning typically is a discharge of electric charges from cloud to cloud and from cloud to ground and vice versa. Occasionally, lightning occurs from a clear sky, indicating the presence of electric charge concentrations in the atmosphere. Aircraft are exposed to all such phenomena and to electric induction emanating therefrom. Even if fuel tanks are inerted, fuel line systems require additional protection.

The problem is aggravated by the fact that weight considerations dictate extensive use of plastics or aluminum alloys in airborne fuel systems. Plastics include dielectrics which are prone to store electric charges.

Aluminum alloys basically have the advantage of being electric conductors. However, aluminum alloys engender other problems that become increasingly serious with the age of typical aircraft.

In particular, common practice is to alleviate buildup of electric charges in metallic fuel lines by electrically interconnecting fuel line sections in series with metallic straps around each section and electric conductors from strap to strap between adjacent sections. Such so-called "grounding systems" are typically sound when a new aircraft is delivered. However, the innate property of most metals to form thin oxide layers at their surfaces may cause such systems to deteriorate with age. The problem is particularly pronounced in the case of aluminum and aluminum alloys which form their natural oxide surface layer rapidly. Such oxide films are electrically insulating or dielectrics, as may be recalled from their high utility in electrolytic capacitors. Similarly, anodized aluminum is well known for its pleasing appearance and corrosion resistance, and represents a further example of an electrically formed electrically insulating surface film. Typical aircraft fuels are electrically insulating and therefore cannot participate in a dissipation of built up electrical charges.

In the case of conventional fuel line systems using aluminum alloys, the inevitably forming oxide surface layer eventually degrades the extremely high electric conductivity between tubing and grounding strap required for a sound prevention of electric charge buildup.

Modern aircraft typically have hundreds of locations where static charges can accumulate and many of these are attached to fuel lines. Since not all joints oxidize at the same time, joints that still are good and the metallic tubing interconnected thereby in series, can conduct considerable electric charges to a single bad joint in the series where these charges will accumulate until dielectric breakdown of sufficient intensity for sparking occurs.

Elimination of such trouble spots would go a long way in improving flight safety.

SUMMARY OF THE INVENTION

It is a primary object of the invention to overcome the above mentioned problems.

It is a germane object of the invention to preclude static charge accumulations over long periods of time.

Other objects of the invention will become apparent in the further course of this disclosure.

The invention resides in a method of precluding buildup of electric charges at fuel lines aboard aircraft, comprising, in combination, preparing for such fuel lines a series of metallic tubes each having opposite open metallic tube ends, preparing external metallic ferrules for the opposite metallic tube ends of these metallic tubes, bonding each metallic ferrule externally to a metallic tube end so that each metallic ferrule and a margin of that metallic tube end extend in one piece circumferentially around an inside of that metallic tube end and axially in one piece for an axial width of that metallic ferrule preparing fuel couplings for interconnecting said metallic tubes at said metallic ferrules; preparing electric conductors for electrically interconnecting said metallic tubes; interconnecting said metallic tubes in series with said fuel couplings at said metallic ferrules bonded externally to said metallic tube ends; arranging said electric conductors outside of said fuel couplings in circumvention of said fuel couplings; and firmly attaching said electric conductors in circumvention of said fuel couplings directly to said bonded metallic ferrules so as to assure zero relative motion between each electric conductor and adjacent metallic ferrule where that electric conductor is attached to that metallic ferrule.

The invention resides also in an aircraft including a fuel line interconnected by fuel couplings and safeguarded against buildup of electric charges, and, more specifically, resides in the improvement comprising, in combination, a series of metallic tubes interconnected by said fuel line couplings and each having opposite metallic tube ends in such fuel line, external metallic ferrules on the opposite metallic tube ends of these metallic tubes, and external electric conductors extending between adjacent metallic ferrules along the fuel line outside of said fuel couplings, said external electric conductors firmly attached to said adjacent metallic ferrules in circumvention of said fuel couplings and there being zero relative motion between each electric conductor and adjacent metallic ferrule where that electric conductor is attached to that metallic ferrule tube end corresponding to that ferrule extending in one piece circumferentially around an inside of that metallic tube end and axially in one piece for an axial width of that metallic ferrule.

BRIEF DESCRIPTION OF THE DRAWING

The subject invention and its various aspects and objects will become more readily apparent from the following detailed description of preferred embodiments thereof, illustrated by way of example in the accompanying drawing which also constitute a written description of the invention, and which is a side view, partially in section, of part of a fuel line assembly according to a preferred embodiment of the invention.

MODES OF CARRYING OUT THE INVENTION

The drawing illustrates methods and apparatus for precluding buildup of electric charges at fuel lines 10 aboard aircraft. The subject invention prepares for such fuel lines a series of metallic tubes each having opposite open metallic tube ends. By way of example, the drawing partially shows two of such tubes 12 and 13.

The invention further prepares external metallic ferrules 14 and 15 for such opposite metallic tube ends, two of which are seen at 16 and 17 for the metallic tubes. A preferred embodiment of the invention further equips each of the metallic ferrules 14 and 15 with an electric discharge terminal 20, 21, 22, 23 for electric charges that would build up during refueling or other use of the system.

In combination with that feature, the invention bonds each metallic ferrule 14 or 15 externally to a metallic tube end 16 or 17 so that each metallic ferrule and a margin of that metallic tube end extend in one piece circumferentially around an inside of that metallic tube end and axially in one piece for an axial width of that metallic ferrule, such as seen in the drawing.

The metallic tubes 12, 13 are interconnected in series for a fuel line 10, and electric discharge terminals 20, 21, etc. are electrically interconnected.

In apparatus terms, an aircraft including a fuel line 10 safeguarded against buildup of electric charges, comprises a series of interconnected metallic tubes each having opposite metallic tube ends in that fuel line, external metallic ferrules 14, 15 on the opposite metallic tube ends 16, 17 of metallic tubes 12, 13, an electric discharge terminal 20, 21 on each of the metallic ferrules, and external electric conductors 25, 26 extending between electric discharge terminals of adjacent metallic ferrules along the fuel line. Each metallic ferrule 14, 15 and a margin of a metallic tube end 16 or 17 corresponding to that ferrule extends in one piece circumferentially around an inside of that metallic tube end and axially in one piece for an axial width of that metallic ferrule.

According to a preferred embodiment of the invention, each metallic ferrule 14, 15 has or is provided with at least two electric discharge terminals 20, 22 or 21, 23. Electric discharge terminals of adjacent ferrules preferably are interconnected with at least two separate electric conductors 25 and 26. Such separate electric conductors 25 and 26 preferably extend between the two electric discharge terminals 20 and 21 and 22 and 23 of adjacent ferrules 14 and 15. In practice, this establishes parallel electric discharge paths, raising the probability that at least one discharge path will remain intact, even as the fuel system or aircraft ages considerably. Preferably, stranded or braided cables are used at 25 and 26 for better endurance of vibration and fatigue than solid straps.

In the context of provision and interconnection of electric discharge terminals 20, 21, etc., the above mentioned one-piece bonding of ferrule and adjacent tube end margin is very important. According to a preferred embodiment of the invention, such bonding includes intermixing metals from each metallic ferrule 14 or 15 and each corresponding margin of a metallic tube end 16 or 17. An admixture of metals of each ferrule 14 or 15 and of a corresponding margin of a metallic tube end 16 or 17 extends in one piece with that ferrule and with that corresponding margin of a metallic tube end circumferentially around an inside of that metallic tube end and axially for an axial width of that metallic ferrule 14 or 15.

Such one-piece bondings and constructions as herein disclosed, together with electric discharge terminals in one piece therewith, distinguish the invention and its embodiments from the above mentioned prior-art grounding systems wherein straps with electric terminals were provided around the tubes of metallic fuel line systems. Unlike the oxide layers that naturally formed between such tubes and their encircling straps, no such electrically insulating or dielectric oxide layers can form between tube ends 16 and 17 and their ferrules 14 or 15 intimately bonded thereto in one piece of each tube end/ferrule combination.

Metal of each margin of a metallic tube end 16 or 17 preferably is in a corresponding metallic ferrule 14 or 15. According to an embodiment of the invention, the above mentioned bonding includes flowing of metal among each metallic ferrule 14 or 15 and each corresponding margin of a metallic tube end 16 or 17.

For increased bonding, one of the metallic ferrule and corresponding margin 14 or 16 has or is provided with an uneven surface, and metal may be flown from the other of such metallic ferrule and corresponding margin into that uneven surface, or is otherwise in interstices of such uneven surface, such as seen in the drawing.

By way of example, the metallic ferrule 14 or 15 may be provided with internal grooves or other uneven internal surface, and metal may be flown from the corresponding margin 16 or 17 into such uneven internal surface. In this or any other manner within the scope of the invention, metal from a corresponding margin at 16 or 17 is in the metallic ferrule 14 or 15, or metal from such corresponding margin is in interstices of an uneven surface of the metallic ferrule.

For minimum resistance and maximum conductance, the above mentioned bonding may include pressing metal of each margin of a metallic tube end 16 and 17 into a corresponding one of the external metallic ferrules 14 and 15, respectively. Cold pressing is presently preferred for that purpose.

According to the best mode currently contemplated, the above mentioned bonding includes swaging each margin of a metallic tube end 16 and 17 into a corresponding one of the external metallic ferrules 14 and 15, respectively. If the metallic ferrule is provided with an uneven internal surface, such bonding includes swaging each margin of a metallic tube end 16 and 17 into such uneven internal surface of a corresponding one of the external metallic ferrules 14 and 15, respectively.

In such preferred embodiments of the invention, metal swaged from the corresponding margin at 16 and 17 is in metallic ferrules 14 and 15, respectively, or in interstices of uneven ferrule surfaces.

Swaging has been very reliable and effective in equipping aircraft fuel lines with ferrules of the type shown at 14 and 15, but without electric terminals prior to the subject invention. Swaging tools may be manual or automatic, such as disclosed in the Swaging Manual published in September 1984 by a predecessor of the assignee of the entire interest, and hereby incorporated by reference herein. By way of example, that manual mentions swaging, brazing, socket welding and butt welding for attaching the ferrule to the tube end. A block 28 with arrow 29 is symbolic of such swaging systems and of other metal flowing or pressing technology.

That Swaging Manual shows different kinds of tube connectors, including the fluid coupling shown in the drawing by way of example. In order to avoid crowding, only an upper cross section of such fluid coupling 30 is shown in the drawing, with the understanding that such coupling extends circumferentially around ferrules 14 and 15.

Fluid coupling 30 comprises a typically two-part retainer 31 circumferentially straddling radial lips of the ferrules 14 and 15, and two split washers 32 and 33 extending around the body of ferrules 16 and 17, respectively. O-rings 34 and 35 are located between retainer 31 and washers 32 and 33, respectively. An externally threaded coupling body 36 and corresponding nut 37 with retainer 38 cooperate in squeezing the washer, O-ring and retainer assembly 32, 33, 34, 35, 31 therebetween, when the nut 37 is tightened upon the coupling body 36 in order to seal the fluid line 10 against the atmosphere, such as by providing a sealing gland for the space inside tubes 12 and 13.

Fluid coupling 30 is of a flexible type and the above mentioned Swaging Manual shows other flexible and rigid tube connectors that can be employed in the practice of the subject invention and its embodiments. These include latch assembly type or clam shell type of couplings.

In the case of some fluid couplings, such as the one shown in the drawing, it is preferable to provide essential coupling parts on the tube sections prior to installation of the ferrules on the tube ends. By way of example, the coupling nut and retainer assembly 37, 38 may be provided on the tube section 12 prior to the swaging of the tube end margin at 16 to the ferrule 14. Similarly, the threaded coupling body 36 may be provided on the tube section 13 prior to the swaging of the tube end margin at 17 to the ferrule 15.

In this respect, the coupling nut and retainer assembly 37, 38 may be located on the ferrule 14 close to terminals 20 and 22, before the tube end margin at 16 is swaged to the ferrule 14. Similarly, the threaded coupling body 36 may be located on the ferrule 15 close to terminals 21 and 23, before the tube end margin at 17 is swaged to the ferrule 15.

For an assembly of adjacent tube sections, split washers 32 and 33 and O-rings 34 and 35 may be slipped over the upturned lips of ferrules 14 and 15, and a two-part retainer 31 may be positioned on such upturned lips. The coupling body 36 may thereupon be slipped over washer 33, O-ring 35, retainer 31, O-ring 34 and washer 32, and the nut 37 may thereupon be threaded onto the coupling body 36 until its retainer 38 squeezes the combination of washer 32, O-ring 34, retainer 31, O-ring 35 and washer 33 into a fluid-tight assembly about the ferrules 14 and 15 and their intimately bonded tube ends 16 and 17.

Electrical conductors 25 and 26 may be attached to terminals 20 and 21 or 22 and 23 by rivets or other fasteners 40 and 41, either before or after the fluid coupling is completed to a tight coupling between tube sections 12 and 13. As seen in the drawing the electric conductors 25 and 26 are arranged outside of the fuel coupling 30 in circumvention of such fuel coupling. Given the well-known nature of rivets, the above mentioned rivets at 40 and 41 present a case of a firm attachment of the electric conductors 25 and 26 assuring zero relative motion between each electric conductor 25 or 26 and its adjacent metallic ferrule 16 or 17 to which it is attached at 20 to 23, respectively.

In this or any other manner within the scope of the invention, a fluid-tight coupling between adjacent tube sections 12 and 13 is paralleled by a perfect electrical connection through tube end margins at 16 and 17, ferrules 14 and 15, and electric conductors 25 and 26, for instance.

Typically, fluid line couplings of the type herein mentioned either are electrically insulating, such as at O-rings, or are of variable electrical conductivity in practical usage.

The technology disclosed in that Manual is sound and has proven its reliability for all kinds of aircraft. However, such technology and its variant of providing clamped-on metallic straps around each tube section for electrical interconnection of such fuel line sections in series, has not consistently provided the high electrical conductance for grounding throughout the useful life of aircraft equipped therewith.

In this respect, electrical conductivity across fluid couplings or otherwise from tube to tube needs to be on the order of a kilo siemens, which corresponds to a milliohm in resistance. This not only prevents the buildup of electric charges, but also avoids voltage drops across couplings high enough for ignition of fuel vapors in the case of current discharges along fuel lines.

The subject invention and its embodiments as herein disclosed provide such high conductance reliably with the aid of technology that can readily be applied to the manufacture and retrofitting of aircraft without the years of preliminary testing that have been typical in the extremely safety conscious aircraft industry for almost every significant change.

This extensive disclosure will render apparent or suggest to those skilled in the art various modifications and variations within the spirit and scope of the invention.

I/we claim:

1. In a method of precluding buildup of electric charges at fuel lines aboard aircraft,
    the improvement comprising in combination:
        preparing for said fuel lines a series of metallic tubes each having opposite open metallic tube ends;
        preparing external metallic ferrules for the opposite metallic tube ends of said metallic tubes;
        bonding each metallic ferrule externally to a metallic tube end so that each metallic ferrule and a margin of that metallic tube end extend in one piece circumferentially around an inside of that metallic tube end and axially in one piece for an axial width of that metallic ferrule;
        preparing fuel couplings for interconnecting said metallic tubes at said metallic ferrules;
        preparing electric conductors for electrically interconnecting said metallic tubes;
        interconnecting said metallic tubes in series with said fuel couplings at said metallic ferrules bonded externally to said metallic tube ends;
        arranging said electric conductors outside of said fuel couplings in circumvention of said fuel couplings; and
        firmly attaching said electric conductors in circumvention of said fuel couplings directly to said bonded metallic ferrules so as to assure zero relative motion between each electric conductor and adjacent metallic ferrule where that electric conductor is attached to that metallic ferrule.

2. A method as in claim 1, wherein:
    material of said metallic ferrules is worked into electric discharge terminals for said electric conductors; and
    said electric conductors are firmly attached directly to said electric discharge terminals in circumvention of said fuel couplings so as to assure zero relative motion between each electric conductor and adjacent electric discharge terminal where that electric conductor is attached to that electric discharge terminal.

3. A method as in claim 1, wherein:

material of each metallic ferrule is worked into at least two electric discharge terminals.

4. A method as in claim 3, wherein:

electric discharge terminals of adjacent ferrules are interconnected in circumvention of said fuel couplings with at least two separate electric conductors firmly attached to said electric discharge terminals worked out of material of each metallic ferrule bonded externally to a metallic tube end.

5. A method as in claim 1, wherein:

said bonding includes intermixing metals from each metallic ferrule and each corresponding margin of a metallic tube end.

6. A method as in claim 1, wherein:

said bonding includes flowing of metal among each metallic ferrule and each corresponding margin of a metallic tube end.

7. A method as in claim 6, wherein:

one of said metallic ferrule and corresponding margin is provided with an uneven surface; and metal is flown from the other of said metallic ferrule and corresponding margin into said uneven surface.

8. A method as in claim 6, wherein:

said metallic ferrule is provided with an uneven internal surface; and metal is flown from the corresponding margin into said uneven internal surface.

9. A method as in claim 1, wherein:

said bonding includes pressing metal of each margin of a metallic tube end into a corresponding one of said external metallic ferrules.

10. A method as in claim 9, wherein:

said pressing is cold pressing.

11. A method as in claim 1, wherein:

said bonding includes swaging each margin of a metallic tube end into a corresponding one of said external metallic ferrules.

12. A method as in claim 11, wherein:

said metallic ferrule is provided with an uneven internal surface; and said bonding includes swaging each margin of a metallic tube end into said uneven internal surface of a corresponding one of said external metallic ferrules.

13. In an aircraft including a fuel line interconnected by fuel couplings and safeguarded against buildup of electric charges, the improvement comprising in combination:

a series of metallic tubes interconnected by said fuel line couplings and each having opposite metallic tube ends in said fuel line;

external metallic ferrules on the opposite metallic tube ends of said metallic tubes; and external electric conductors extending between adjacent metallic ferrules along said fuel line outside of said fuel couplings, said external electric conductors firmly attached to said adjacent metallic ferrules in circumvention of said fuel couplings and there being zero relative motion between each electric conductor and adjacent metallic ferrule where that electric conductor is attached to that metallic ferrule;

each metallic ferrule and a margin of a metallic tube end corresponding to that ferrule extending in one piece circumferentially around an inside of that metallic tube end and axially in one piece for an axial width of that metallic ferrule.

14. An aircraft including a fuel line as in claim 13, wherein:

each metallic ferrule has at least one electric discharge terminal made of material of that metallic ferrule;

one of said electric conductors firmly attached to said electric discharge terminal in circumvention of said fuel couplings and there being zero relative motion between said electric conductor and said electric discharge terminal where that electric conductor is attached to said electric discharge terminal.

15. An aircraft including a fuel line as in claim 13, wherein:

at least two separate electric conductors extend between adjacent ferrules and firmly attached to said adjacent ferrules in circumvention of said fuel couplings and there being zero relative motion between each electric conductor and adjacent metallic ferrule where that electric conductor is attached to that metallic ferrule.

16. An aircraft including a fuel line as in claim 13, wherein:

an admixture of metals of each ferrule and of a corresponding margin of a metallic tube end extends in one piece with that ferrule and with the corresponding margin of a metallic tube end circumferentially around an inside of that metallic tube end and axially for said axial width of that metallic ferrule.

17. An aircraft including a fuel line as in claim 13, wherein:

metal of each margin of a metallic tube end is in a corresponding metallic ferrule.

18. An aircraft including a fuel line as in claim 13, wherein:

one of said metallic ferrule and corresponding margin has an uneven surface; and metal from the other of said metallic ferrule and corresponding margin is in interstices of said uneven surface.

19. An aircraft including a fuel line as in claim 13, wherein:

metal from said corresponding margin is in said metallic ferrule.

20. An aircraft including a fuel line as in claim 13, wherein:

said metallic ferrule has an uneven surface; and metal from said corresponding margin is in interstices of said uneven surface.

21. An aircraft including a fuel line as in claim 13, wherein:

metal swaged from said corresponding margin is in said metallic ferrule.

22. An aircraft including a fuel line as in claim 13, wherein:

said metallic ferrule has an uneven surface; and metal swaged from said corresponding margin is in interstices of said uneven surface.

* * * * *